Patented Sept. 28, 1926.

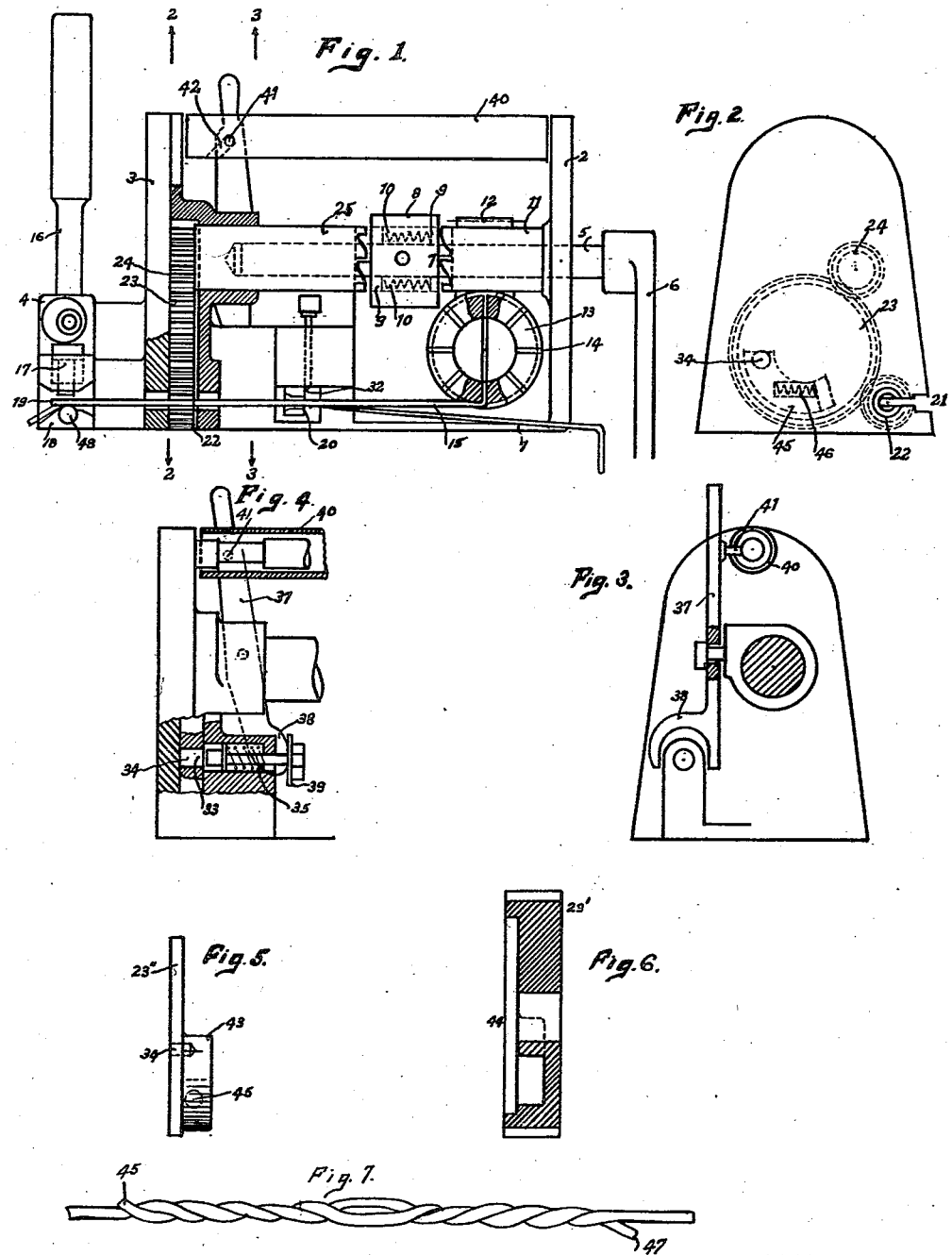

1,601,196

UNITED STATES PATENT OFFICE.

ANTON WILHELM WOLFF, OF COLOGNE, GERMANY.

WIRE BALE FASTENING APPARATUS.

Application filed May 4, 1926, Serial No. 106,635, and in Germany March 16, 1925.

This invention relates to improvements in appliances in which through the revolving of a shaft there is first tightened the wire placed around an article to be fastened, whereupon the ends of the wire lying parallel to each other are intertwined and finally one of the ends of the wire is cut off.

The essential feature of my invention lies in the fact that the clutch rigidly connected with the driving shaft is provided on both ends with engagement teeth inclined in opposite directions, elastically and axially displaceable, and that the release of the locking bolt of the reel dropping automatically upon the termination of each working cycle, takes place through the turning of the handle. In this manner there is avoided a change of handles in the operation of the appliance.

The operator takes hold of the handles with his left hand and of the crank with his right hand. By turning the latter in one direction, the wire is tightened and by turning it in the opposite direction the wire is intertwined and cut off. By slightly turning the handle there is thereupon released, without the handle having to be released, the locking bolt and the appliance is ready for a new working cycle. My improvement refers furthermore to the device which permits of the turning of the intertwining device being continued a little beyond the contemplated final position, in order to avoid the cut off end of the wire projecting outwards. This improvement consists in having the locking hole for the wire intertwining gearing not directly in the gear wheel to be locked, but in a rotatable disc concentric to this gear wheel, which disc engages, by means of a projecting cam, a corresponding recess of the gear wheel, so that it is possible to arrange a spring intended to push back the gear wheel a sufficiently long coil spring between the cam and the terminal wall of the recess which is entirely protected.

In the attached drawings there is shown by way of example an apparatus embodying my invention, in which Fig. 1 is a side elevation, partly in section, of the complete appliance;

Fig. 2 is a cross section, taken on the line X—X of Fig. 1;

Fig. 3 is a cross section, taken on line Y—Y of Fig. 1;

Fig. 4 is a sectional side view of a part of the apparatus shown in Fig. 1;

Figs. 5 and 6 are detail side views of a part of the gearing; and

Fig. 7 illustrates on an enlarged scale a wire intertwined by means of the apparatus.

The apparatus consists of a foundation plate 1 which is provided with two uprights or standards 2 and 3 and a low block 4. On standards 2 and 3 is journalled a driving shaft 5, which shafts is revolved by means of a crank 6. On shaft 5 there is secured by means of a pin 7, a clutch 8, which carries axially displaceable clutch pins 9, which pins are pushed outwards at both ends of the clutch by spring 10. The heads of these clutch pins are in the form of inclined engagement teeth. The clutch pins shown on the right in the drawings engage by their heads corresponding recesses on the front of a sleeve 11, which is mounted rotatably on shaft 5 and which is provided with a worm 12 which engages a worm gear on the periphery of the tightening drum 13. Tightening drum 13 is a cylindrical rotatable member having one end thereof provided with a number of radial slots 14, in which is laid one of the ends of wire 15. By revolving the drum 13 in the direction of the arrow, end 15 of the wire is drawn tight, because the other end of the wire has been previously clamped by a displacing eccentric lever 16 toward the left and by the consequent pressing down of clamping bolt 17 on base member 18. In operating the apparatus the free end of the wire is first clamped between 17 and 18 and the wire is led towards the right over and around the article to be fastened, and is then brought up again on the left and laid parallel to the clamped end and close to this toward tightening drum 13 and is inserted under a fold in slot 14. By turning crank 6 in the one direction, tightening drum 13 is revolved in the direction of the arrow and the wire is tightened. The wire end 19 clamped between 17 and 18 and the other wire end of the wire 15 lie parallel close to each other from the clamping point 17—18 to the outlet point 20. They lie likewise in the slot of a pinion 22 which is mounted for rotation in standard 3. This pinion is rotated by gear 23 likewise mounted in standard 3, gear 23 being driven by pinion 24, which lies on sleeve 25, which is freely rotatable on driving shaft 5. Sleeve 25 is provided on its right hand end with recesses in which engage the heads of the engagement teeth 9 at the left side of clutch 8, these inclined recesses and engagement teeth having an inclination opposite to the inclination of the teeth at the right hand side of clutch 8. By rotating shaft 5 by means of crank 6 in one direction, the sleeve 11 is entrained and upon shaft 5 being turned in the opposite direction, the sleeve 25 is entrained. Upon sleeve 25 being entrained and rotated, pinion 24 is revolved, which drives gear 23, which in turn drives pinion 22, whereby the two wire ends 19 and 15 lying along each other in the slot of this pinion 22 are intertwined. Pinions 22 and 24 have an equal number of teeth and gear 23 has three times as many teeth as either of said pinions. Consequently, for every three revolutions of shaft 5, gear 23 performs a single revolution and pinion 22, three revolutions. The three revolutions of pinion 22 are sufficient to bring about the intertwining shown in Fig. 7. The cutting off of the wire takes place in the wellknown manner by means of a knife 32 which is operated from the axis of gear 23.

In order to automatically bring to a stop the device after the completion of the three revolutions of shaft 5, provision is made for locking bolt 33, Fig. 4, which engages opening 34 in gear 23. Locking bolt 33 is pressed continuously by coil spring 35 against gear 23, so that upon said bolt coming abreast of opening 34, it snaps automatically into such opening. In order to unlock the apparatus, bolt 33 can be pushed toward the right by double lever 37 swinging around pin 36, which lever brings its lower fork 38 against the disc 39 attached to bolt 33. The necessary swinging of lever 37 is brought about by slightly turning handle 40, which is in the form of a tube, around its longitudinal axis. The upper end of lever 37 engages, by means of a pin 41 in a slanting slot 42 of tube 40, so that upon the latter being turned, the upper end of lever 37 is moved toward the left and its lower fork 38 is moved toward the right.

To afford the possibility of easily removing the apparatus from the completed wire fastening and in order to avoid the cut off wire end projecting outwards, it is necessary to continue the intertwining of the wire somewhat beyond the contemplated terminal position and then to go back to such terminal position. For this purpose I utilize the following device:

Gear 23 consists of two members 23' and 23" arranged concentrically and one rotatable within the other (Figs. 5 and 6). Member 23" carries a high standing segment-like cam 43 and member 23' is provided with a corresponding recess 44, which, however, is somewhat longer than cam 43. Cam 43 is provided with bore 45, in which there is disposed a coil spring 46. Member 23 is provided with locking hole 34 hereinbefore described. Upon locking bolt 33 snapping into hole 34, gear 23' is therefore allowed to continue to rotate a distance equal to the difference between the lengths of the cam 43 and the recess 44. Thereupon coil spring 46 is compressed and as soon as the rotation ceases it pushes gear 23' back into its terminal position.

Having thus described my invention, what I claim is:

1. In a wire bale fastening apparatus, the combination of a rotatable shaft, an intertwining device operated by said shaft, means for locking said intertwining device against rotation, a pivoted lever for releasing said locking means, and rotatable means for swinging said lever on its pivot.

2. An apparatus of the character described, comprising in combination, a shaft mounted for rotation, a clutch member secured to said shaft for rotation therewith said clutch member having axially displaceable teeth projecting from opposite ends thereof, the teeth at one end being inclined in a direction opposite from those at the other end, springs between the oppositely disposed teeth adapted normally to retain said teeth in projected position, a pair of sleeves mounted for rotation on said shaft one at each end of said clutch member and each provided with teeth adapted to engage the displaceable teeth at the adjacent end of the clutch member, a rotatable wire-tightening member, gearing for transmitting motion from one of said sleeves to said wire-tightening member, rotatable wire twisting means, and gearing for transmitting motion from the other of said sleeves to said wire-twisting means.

In testimony whereof I have signed my name to this specification.

ANTON WILHELM WOLFF.